United States Patent [19]

Igi et al.

[11] Patent Number: 4,702,630
[45] Date of Patent: Oct. 27, 1987

[54] FACSIMILE-PRINTER APPARATUS

[75] Inventors: Hisashi Igi; Tomohiro Yamada; Tomohisa Higuchi, all of Nagoya; Eiichi Ohta, Handa; Hiroaki Yazawa, Nagoya, all of Japan

[73] Assignee: Brother Kogyo Kabushiki Kaisha, Aichi, Japan

[21] Appl. No.: 877,410

[22] Filed: Jun. 23, 1986

[30] Foreign Application Priority Data

Jun. 26, 1985 [JP] Japan .................. 60-142090

[51] Int. Cl.⁴ .............. B41J 3/54; H04N 1/21
[52] U.S. Cl. .................. 400/82; 101/93.12; 400/121; 358/296
[58] Field of Search ............ 101/93.11, 93.12; 400/82, 121, 120; 358/280, 285, 296

[56] References Cited

U.S. PATENT DOCUMENTS

| | | | |
|---|---|---|---|
| 4,403,874 | 9/1983 | Payne | 400/82 X |
| 4,480,541 | 11/1984 | Grummett | 400/82 X |
| 4,504,868 | 3/1985 | Hasuike | 358/280 |
| 4,521,814 | 6/1985 | Ono | 358/296 |
| 4,549,222 | 10/1985 | Fogaro | 358/280 X |
| 4,575,769 | 3/1986 | Arnoldi | 358/285 |
| 4,576,490 | 3/1986 | Isobe | 400/82 |

FOREIGN PATENT DOCUMENTS

| | | | |
|---|---|---|---|
| 5775 | 1/1981 | Japan | 400/82 |
| 42984 | 3/1984 | Japan | 400/82 |

OTHER PUBLICATIONS

*IBM Tech. Disc. Bulletin,* by R. T. Sha et al., vol. 27, No. 1B, Jun. 1984, pp. 841-843.

*Primary Examiner*—Paul T. Sewell
*Attorney, Agent, or Firm*—Parkhurst & Oliff

[57] ABSTRACT

A facsimile-printer combination of a dot-matrix type, including: a first and a second printing device operable in a fascimile mode and a printer mode according to first and second printing information, respectively, for selectively producing dots on a recording medium, at a first printing pitch in metric and a second printing pitch in inch unit, respectively, in a direction of width of the recording medium; a first and a second feeding device in association with the first and second printing devices, for feeding the recording medium at a first feeding pitch the metric unit and a second feeding pitch in the inch unit, respectively, in a direction of length of the recording medium; an input device for receiving the first and second printing information output devices; and a selector device for rendering the first printing and feeding devices operative when the first printing information is received by the input device, and rendering the second printing and feeding devices operative when the second printing information is received by the input device.

6 Claims, 7 Drawing Figures

FACSIMILE-PRINTER APPARATUS

BACKGROUND OF THE INVENTION

1. Field of Art

The present invention relates generally to a facsimile apparatus, and more particularly to a facsimile-printer combination which is operable selectively in a facimile mode or a printer mode.

2. Related Art Statement

Various types of printing instruments such as ordinary printers and facsimile equipment are widely used for reproducing images on a recording medium according to printing information received from an external output device. Recently, dot-matrix printers capable of printing characters with a matrix of dots are increasingly employed in place of impact printers using a daisy type wheel or the like which has a multiplicity of type fonts or printing elements corresponding to characters. The facsimile machines are designed, at the outset of their development history, as a dot-type image reader-printer combination capable of sending and receiving graphical images in the form of drawings and graphs for example, as well as lines of characters.

Dot-matrix printers and facsimile machines are very similar in nature to each other in that both types of printing equipment are designed to effect printing according to information received from an external output device. However, the dot-matrix printers and the facimile machines are offered and used as two different and separate or independent types of apparatus or equipment. This dichotomy seems to result partly from the fact that the printing pitch of the facimile machine is specified in the metric unit (for instance, eight dots or 3.85 dots are usually used per millimeter), while the printing pitch of the dot-matrix printer is specified in the inch unit. Hence, the printing arrangement used in the facsimile machine cannot be used as an ordinary printer, and the user must invest in the two similar types of equipment. Further, the use of the two machines requires a comparatively large installation space, and different kinds of recording media and print ribbons.

SUMMARY OF THE INVENTION

It is accordingly an object of the present invention to provide a facsimile-printer combination which is operable selectively in a facimile mode or a printer mode.

Figure 1:
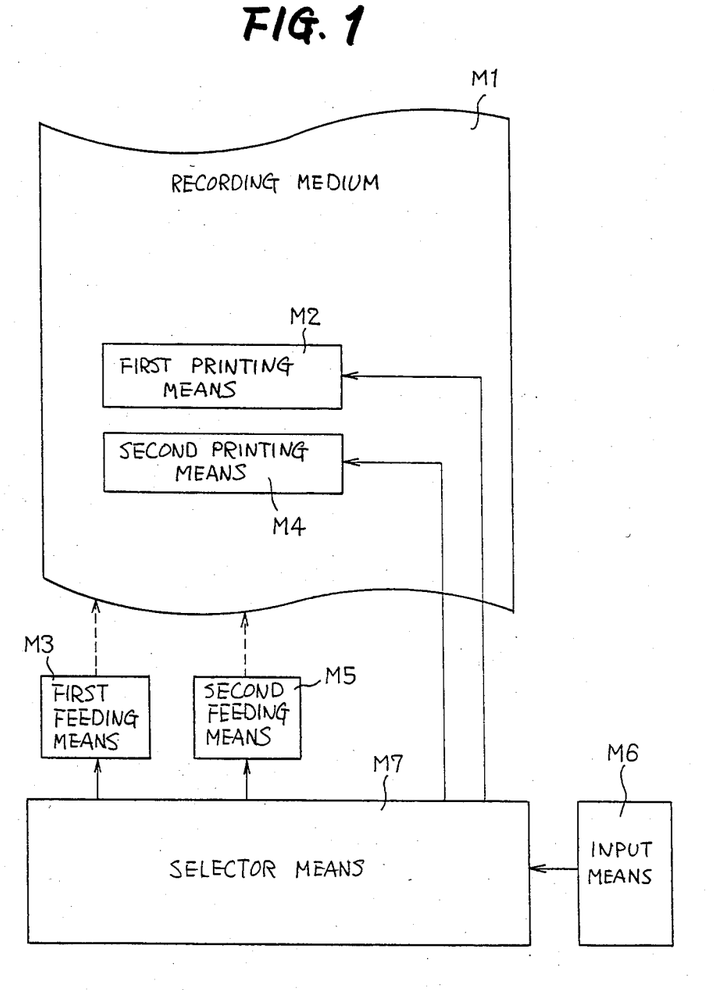
FIG. 1 is a schematic view illustrating a basic arrangement of a fascimile-printer apparatus of the present invention.

The above object of the present invention is achieved by a facimile-printer combination of a dot-matrix type as shown in FIG. 1, which comprises first printing means M2 operable in a facsimile mode according to first printing information, first feeding means M3 operable in association with the first printing means M2, second printing means M4 operable in a printer mode according to second printing information, second feeding means M5 operable in association with the second printing means M4, input means M6 for receiving the first and second printing information from output means, and selector means M7 which is connected to the input means M6, first and second printing means M2, M4, and first and second feeding means M3, M5. The first printing means M2 is adapted to selectively produce first dots on a recording medium M1, at a first printing pitch in the metric unit in a direction of width of the recording medium M1, and the first feeding means M3 is adapted to feed the recording medium M1 at a first feeding pitch in the metric unit in a direction of length of the recording medium M1. The second printing means M4 is adapted to selectively produce second dots on the recording medium M1, at a second printing pitch in the inch unit in the direction of width of the medium M1, and the second feeding means M5 is adapted to feed the medium M1 at a second feeding pitch in the inch unit in the direction of length of the medium M1. The selector means is adapted to render operable the first printing means M2 and the first feeding means M3 when the first printing information is received by the input means M6, and render operable the second printing means M4 and the second feeding means M5 when the second printing information is received by the input means M6.

In the facsimile-printer combination, the facsimile mode is established when the input means M6 receives the first printing information from a communication line. In this facsimile mode, the first printing and feeding means M2 and M4 are operable, whereby the dot printing and the feeding of the medium M1 are effected at the predetermined printing and feeding pitches which are specified in the metric unit. On the other hand, the printer mode is established when the input means M6 receives the second printing information from a suitable output device. In the printer mode, the second printing and feeding means M4 and M5 are operable, whereby the printing and feeding operations are carried out at the predetermined printing and feeding pitches which are specified in the inch unit. Thus, the instant facsimile-printer combination functions selectively as a facsimile machine or as a dot-matrix printer, and therefore requires a comparatively small installation space and a comparatively reduced equipment cost. Further, the instant facsimile-printer combination apparatus requires only a single kind of recording medium and print ribbon, leading to simplified inventory control of these materials.

According to one feature of the invention, the first feeding means comprises a feed roll rotatably supported for feeding the recording medium, an electrically-operated feed motor operable in opposite directions, and a first rotary transmission linkage for imparting a motion of the feed motor in one of the opposite directions to the feed roll. The first rotary transmission linkage inlcudes a first one-way clutch which inhibits transmission of a motion of the feed motor in the other direction to the feed roll. On the other hand, the second feeding means comprises a second rotary transmission linkage for imparting the motion of the feed motor to the feed roll. The second rotary transmission linkage has a speed reduction ratio different from that of the first rotary transmission linkage, and includes a second one-way clutch which inhibits transmission of the motion of the feed motor in the one direction to the feed roll. Thus, the feed roll and the feed motor are commonly used by the first feeding means and the second feeding means.

According to another feature of the invention, the first printing means comprises a first printing head, a first head-driving device, and a first pulse generator. The first printing head has a plurality of printing elements for producing the first dots, and is movable in the direction of width of the recording medium. The first head-driving device is operated to move the first printing head in the direction of width of the recording medium. The first pulse generator is adapted to generate a timing pulse each time the first printing head is moved a predetermined distance. The first printing head is responsive to the timing pulse to selectively activate the plurality of printing elements according to the first printing information. Further, the second printing means comprises a second printing head, a second head-driving device and a second pulse generator, which are similar to the first printing head, the first-head driving device and the first pulse generator, respectively.

In one form of the above feature of the invention, the first and second head-driving devices are constituted by a single head-driving device which is commonly used by the first and second printing heads. The first pulse generator generates the timing pulse to indicate the first printing pitch in the metric unit, and the second pulse generator generates the timing pulse to indicate the second printing pitch in the inch unit.

In accordance with a further feature of the invention, the first printing means comprises a first printing head of a reciprocating shuttle type reciprocable in the direction of width of the recording medium, a head-driving device for reciprocating the first printing head in the direction of width of the recording medium, and a first pulse generator. The first printing head has a plurality of first printing elements which are spaced apart in the direction of width from each other by a predetermined spacing in the metric unit. The head-driving device reciprocates the first printing head in the direction of width of the recording medium by a predetermined reciprocating distance large than the predetermined spacing of the first printing elements. The head-driving device includes an electrically-operated head-drive motor, and a cam mechanism for converting a rotary motion of the head-drive motor into linear reciprocating motions of the first printing head. The first pulse generator includes a first rotary disk which is rotated by the head-driver motor and which has a plurality of first slits equally spaced apart from each other in a circumferential direction of the first rotary disk. The first pulse generator further includes a first photoelectric sensor disposed so as to detect the first slits during rotation of the first rotary disk. On the other hand, the second printing means comprises a second printing head of a reciprocating shuttle type reciprocable in the direction of width of the recording medium, and a second pulse generator. The first printing head has a plurality of second printing elements which are spaced apart in the direction of width from each other by a predetermined spacing in the inch unit. The second printing head is fixed to the first printing head and reciprocable with the first printing head by the head-driving device. The second pulse generator includes a second rotary disk which is rotated by the head-drive motor and which has a plurality of second slits equally spaced apart from each other in a circumferential direction of the second rotary disk. An angular spacing of the second slits is different from that of the first slits formed in the first rotary disk. The first pulse generator further includes a second photoelectric sensor disposed so as to detect the second slits during rotation of the second rotary disk.

According to a still further feature of the invention, the input means comprises a serial input port which receives the first printing information in a serial form, and a parallel input port which receives the second printing information in a parallel form.

BRIEF DESCRIPTION OF THE DRAWINGS

The above and other objects, features and advantages of the present invention will become more apparent by reading the following detailed description of a preferred embodiment of the invention, when considered in connection with the accompanying drawings, in which.

DETAILED DESCRIPTION OF THE PREFERRED EMBODIMENT

Figure 2:
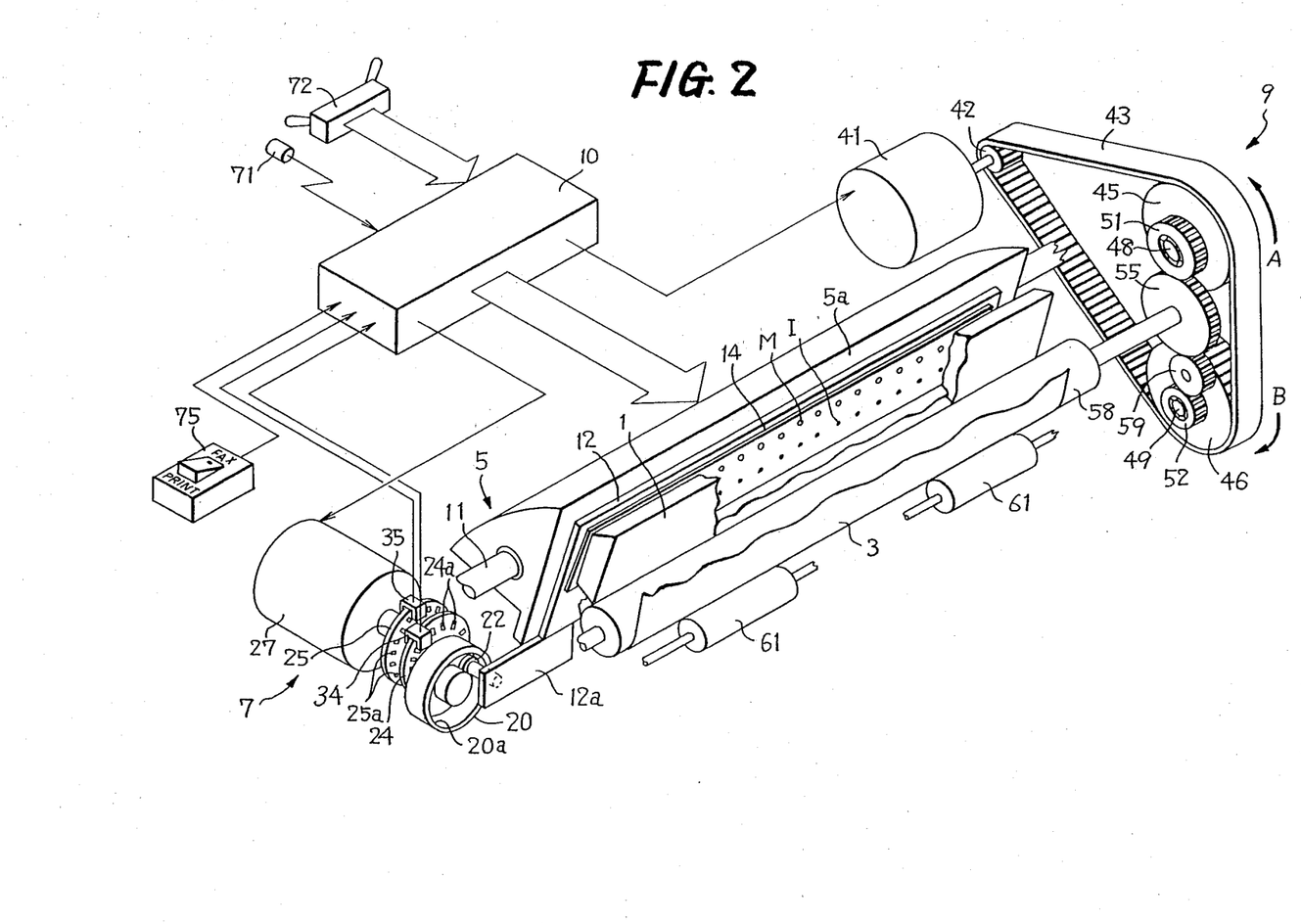
FIG. 2 is a partly cut-away, perspective view of one embodiment of the fascimile-printer apparatus, taken from one side of the apparatus at which a recording medium is inserted.
Figure 3:
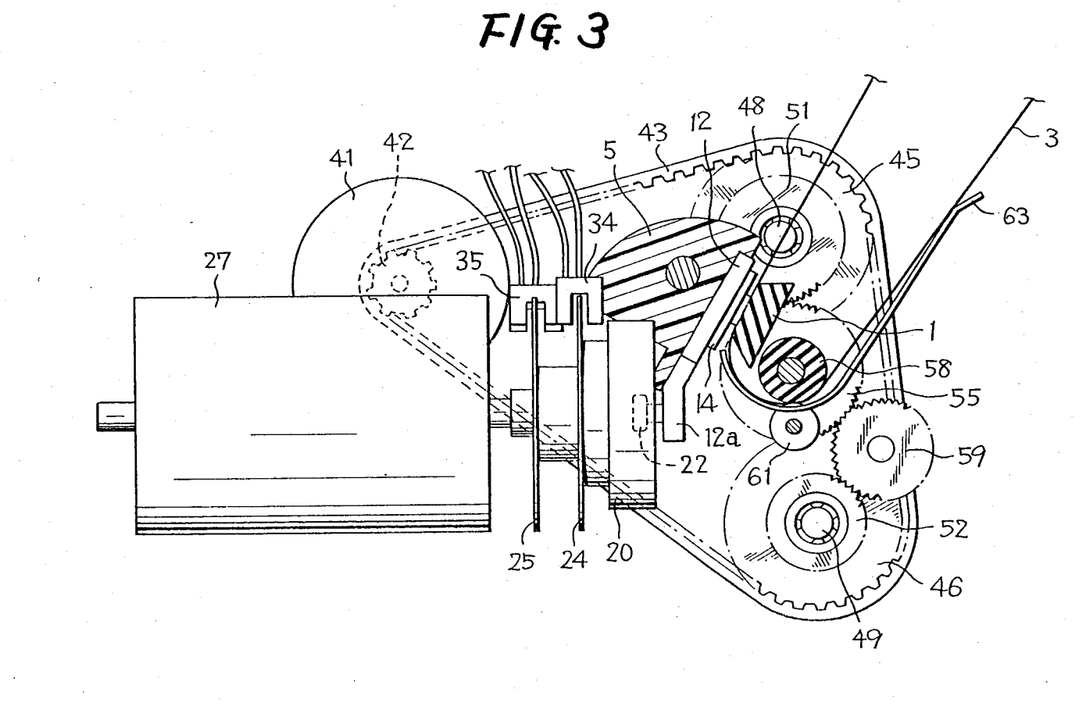
FIG. 3 is a side elevational view of the facsimile-printer apparatus of FIG. 2.

Referring to FIGS. 2 and 3, there is illustrated the prefered embodiment of a facsimile-printer apparatus wherein images are printed with a matrix of dots on a recording medium in the form of a sheet of paper 3. The facsimile-printer apparatus includes as its major elements: a dot-matrix printing head assembly 5 of a reciprocating shuttle type operable for producing dots on the sheet of paper 3, which assembly 5 is fed between the printing head 5 and a generally elongate planar platen 1; a head-driving device 7 for reciprocating the printing head assembly 5 in a direction of width of the paper 3 (hereinafter referred to as "width direction"); a paper feeding device 9 for feeding the paper 3 in a direction of length of the paper 3 (hereinafter referred to as "length direction") perpendicular to the direction of width; and an electronic control device 10 for controlling the operations of the above major elements 5, 7 and 9.

The printing shuttle head assembly 5 (hereinafter referred to as "shuttle head assembly") is supported at its oppposite ends by a pair of guide shafts 11, 11 slidably in the width direction. The shuttle head assembly 5 has a radiator plate 12 attached to its surface opposite to the platen 1, and a ceramic substrate 14 which is mounted on the radiator plate 14. The ceramic substrate 14 incorporates two rows M and I of printing elements which extend along the axes of the guide rods 11, 11 (in the width direction). Each printing element is formed by a thick-film resistor. More specifically, the printing elements of the first row M are spaced from each other by a spacing distance of 2 mm. The first row M serves as a printing portion of a first printing head which is operable in a facsimile mode (which will be described). On the other hand, the heat generating elements of the second row I are spaced from each other by a spacing distance of 8/90 inch. The second row I serves as a printing portion of a second printing head which is operable in a printer mode (which will be described). The ceramic substrate 14 is fixed to the shuttle head assembly 5 via the radiator plate 12.

The radiator plate 12 has an extension 12a at its one end, which extends toward a peripheral cam 20 of the head-driving device 7. The extension 12a supports at its free ehd a cam follower 22 which engages a cam groove 20a formed in the cam 20. The cam 20 is rotated together with first and second rotary disks 24, 25, by an electrically-operated head-drive motor in the form of a DC motor 27. The peripheral cam 20 is eccentric with respect to a drive shaft of the DC motor 27, by a radial distance of about 1.25 mm, so that the cam follower 22 engaging the cam groove 20a is reciprocated over a distance of about 2.5 mm in the width direction of the paper 3, during rotation of the cam 20. As a result, the shuttle head assembly 5 slidably supported by the guide shafts 11, 11 is reciprocated over the same distance.

The first and second rotary disks 24, 25 cooperate with respective first and second photoelectric sensors 34, 35 to constitute first and second pulse generators which function to detect printing positions at which dots are produced on the paper 3 by the first and second rows M, I of heat generating elements while the shuttle head assembly 5 is reciprocated. While the printing by each row of heat generating elements may be effected in one of opposite directions of the reciprocating movements of the shuttle head assembly 5, or in both of the opposite directions for improved printing efficiency, it is assumed in the interest of brevity and simplification of the following description that the present facimile-printer apparatus is adapted to effect printing only in the rightward movement of the head assembly 5 (in FIG. 2).

The first rotary disk 24 has a plurality of first slits 24a which are spaced apart from each other in the circumferential direction of the disk 24. The first photoelectric sensor 34 is disposed so as to detect the first slits 24a during rotation of the first rotary disk 24, and generate a timing pulse Tm when each of the first slits 24a is detected. The number of the first slits 24a, that is, the angular spacing of the slits 24a, is determined so that the timing pulse Tm is generated each time the shuttle head assembly 5 is moved a distance of $\frac{1}{8}$ mm. Since the heat generating elements M of the first row operable in the facsimile mode are arranged at intervals of 2 mm, the photoelectric sensor 34 generates a total of 16 (2 divided by $\frac{1}{8}$) timing pulses Tm during each rightward movement of the shuttle head assembly 5. Similarly, the second rotary disk 25 has a plurality of second slits 25a whose angular spacing is different from that of the first slits 24a. Described in more detail, a second photoelectric sensor 35 is disposed so as to detect the second slits 25a during rotation of the second rotary disk 25, and generate a timing pulse Ti when each of the second slits 25a is detected. The angular spacing of the slits 25a, is determined so that the timing pulse Ti is generated each time the shuttle head assembly 5 is moved a distance of 1/90 inch. Since the heat generating elements I of the second row operable in the printer mode are arranged at intervals of 8/90 inch, the photoelectric sensor 35 generates a total of eight (8/90 divided by 1/90) timing pulses Ti during each rightward movement of the shuttle head assembly 5.

The construction and operation of the paper feeding device 9 for feeding the paper 3 will now be described. The feeding device 9 includes an electrically-operated feed motor in the form of a stepping motor 41 which is operable in opposite directions. Rotary motions of the stepping motor 41 are imparted to a first toothed pulley 45 and a second toothed pulley 46 via a motor pulley 42, and a timing belt 43 which engages the motor pulley 42 and the first and second toothed pulleys 45, 46. The first toothed pulley 45 is coupled to a first gear 51 via a first one-way clutch 48, while the second toothed pulley 46 is coupled to a second gear 52 via a second one-way clutch 49. The first one-way clutch 48 is adapted to impart a motion of the timing belt 43 in one direction (indicated by arrow A in FIG. 2) to the first gear 51, while the second one-way clutch 49 is adapted to impart a motion of the timing belt 43 in the other direction (indicated by arrow B) to the second gear 52. The first gear 51 meshes with a main gear 55 fixed to a feed roll 58, while the second gear 52 is operatively connected to the main gear 55 via an intermediate gear 59. In this arrangement, the main gear 55 and consequently the feed roll 58 are rotated in the same direction when the timing belt 43 is rotated in either one of the opposite directions A and B. Thus, the motor pulley 42, timing belt 43, first toothed pulley 45, first one-way clutch 48, first gear 52 and main gear 55 constitute a first rotary transmission linkage, while the motor pulley 42, timing belt 43, second toothed pulley 46, second one-way clutch 49, second gear 52, intermediate gear 59 and main gear 55 constitute a second rotary transmission linkage.

Described in greater detail, when the stepping motor 41 is operated on one step in the clockwise direction (corresponding to the direction A), the paper 3 is fed by a predetermined distance of 1/7.7 mm, which is determined by a radius ratio of the motor pulley 42 to the first toothed pulley 45 and by a gear ratio of the first gear 51 to the main gear 55. Thus, the stepping motor 41 and the feed roll 58 cooperate with the first rotary transmission linkage to constitute first feeding means for feeding the paper 3 at a first feeding pitch (1/7.7 mm) in the metric unit. When the stepping motor 41 is operated in one step in the counterclockwise direction (corresponding to the direction B), the paper 3 is fed in the same direction by a predetermined distance of 1/90 inch, which is determined by a radius ratio of the motor pulley 42 to the second toothed pulley 46 and by a gear ratio of the second gear 52 to the main gear 55. Thus, the stepping motor 41 and the feed roll 58 cooperates with the second rotary transmission linkage to constitute second feeding means for feeding the paper 3 at a second feeding pitch (1/90 inch) in the inch unit. As indicated in FIG. 3, the paper 3 is inserted through a nip of the feed roll 58 and presser rolls 61. Upon rotation of the feed roll 58, the paper 3 is fed while being guided by a paper guide 63, along a paper path leading to a gap between the platen 1 and the ceramic substrate 14 which incorporates the heat generating elements M, I. As indicated above, the first and second feeding means of the paper feeding device 9 are selectively rendered operative by selecting the corresponding one of opposite operating directions of the stepping motor 41. The operating direction of the stepping motor 41 is reversed by the control device 10 by reversing the order of energization of phases of coil windings in the motor 41.

Figure 4:
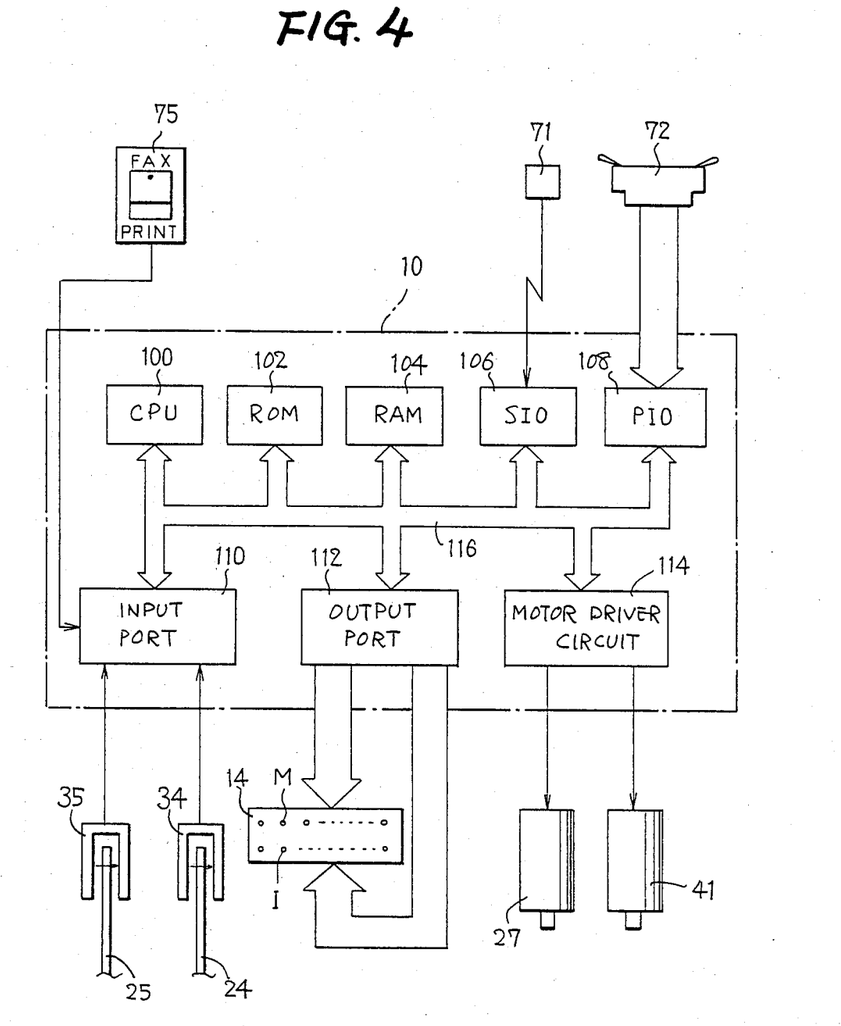
FIG. 4 is a schematic block diagram of an electronic control system of the apparatus.

The control device 10 which controls the operations of the head-driving device 7 and the paper feeding device 9, are assigned to perform other operations such as: supplying the shuttle head assembly 5 with printing signals to selectively activate the first and second rows M, I of heat generating elements; receiving printing information from an external communication line or an external output device via a connector 71 or 72; selecting the facsimile mode or printer mode in response to a signal from a mode selector switch 75. Described more particularly referring to FIG. 4, the control device 10 includes a central processing unit CPU 10, a read-only memory ROM 102, and a random-acess memory 104, which are well known in the art. The control device 10 further includes various input/output circuits and ports which include: a serial I/O port (SIO) 106 which receives first printing information from an external communication line via the connector 71, so that the instant facsimile-printer apparatus is operated as a facsimile apparatus according to the first printing information; a parallel I/O port (PIO) 108 which receives second printing information from an external output device such as a computer, via the connector 72, so that the apparatus is operated as a printer according to the second printing information; an input port 110 which receives a mode signal from the mode selector switch 75, and the timing signals Tm, Ti from the photoelectric sensors 34, 35; an output port 112 which provides printing signals to activate the heat generating elements M and I of the first and second printing heads of the shuttle head assembly 5; and a motor driver circuit 114 which provides drive signals to activate the DC motor 27 of the head-driving device 7 and the stepping motor 41 of the paper feeding device 9. The CPU 100 is connected to the other elements by a common data bus 116, for interactive data communication within the control device 10.

Figure 5:
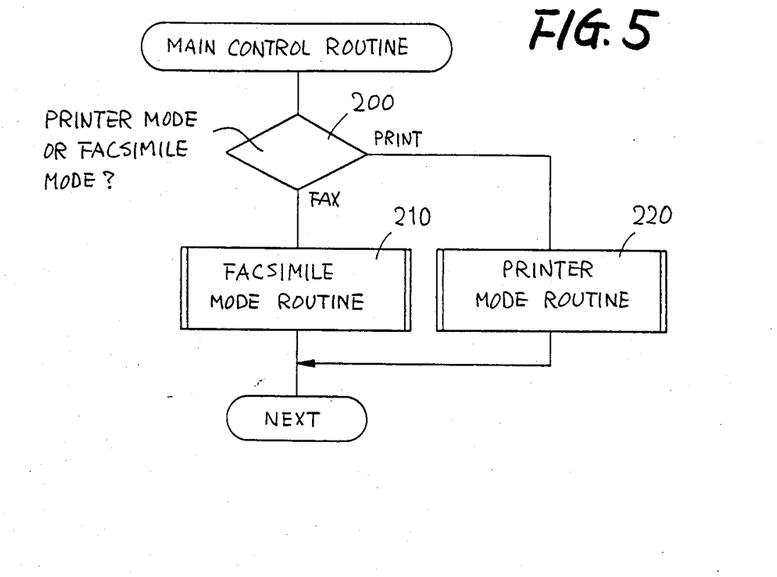
FIG. 5 is a flow chart showing a main control routine executed by the control system.

Referring further to a flow chart of FIG. 5, the operation of the thus constructed control device 10 will be described. Upon application of power to the control device 10, step 200 is executed after an initializing routine is executed. In step 200, the CPU 100 checks if the mode signal from the mode selector switch 75 indicates the facsimile or printer mode. In the facsimile mode, the instant facsimile-printer apparatus is used as a facsimile apparatus. In the printer mode, the apparatus is used as a printer.

If the facsimile mode is selected on the mode selector switch 75, the CPU 100 goes to step 210 to execute a "facsimile mode" routine in which the apparatus is operated in the facsimile mode. More specifically, upon reception of the first printing information through the connector 71 and the SIO 106, the DC motor 27 of the head-driving device 7 is started to reciprocate the shuttle head assembly 5 at a predetermined constant speed, and the heat generating elements M of the first printing head are selectively activated at a time interval specified by the timing pulse Tm generated by the photoelectric sensor 34. As previously described, the photoelectric sensor 34 generates the timing pulses Tm each time the shuttle head assembly 5 is moved a distance of ⅛ mm. Consequently, the photoelectric sensor 34 generates a total of 16 timing pulses Tm while the shuttle head assembly 5 is moved by a distance of 2 mm, which is a spacing of the heat generating elements M. When each timing pulse Tm is generated, each of the heat generating elements M is commanded to be activated or remain deactivated according to the received first printing information. As a result, dots are selectively produced along a line on the paper 3 in its width direction. In the present embodiment, the paper 3 is a heat-sensitive paper. When the heat generating elements M are energized and heated, the portions of the paper facing the elements M are thermally colored. After the rightward movement of the shuttle head assembly 5 is completed, the stepping motor 41 of the paper feeding device 9 is operated by one step in the clockwise direction while the head assembly 5 is returned in the leftward direction, whereby the paper 3 is fed by a distance of 1/7.7 mm. With the above-indicated operation repeated, images represented by the first printing information received at the SIO 106 are reproduced with a matrix of dots which are arranged at the printing pitch of ⅛ mm in the width direction of the paper 3, and at the feeding pitch of 1/7.7 mm in the length direction.

Figure 6A:
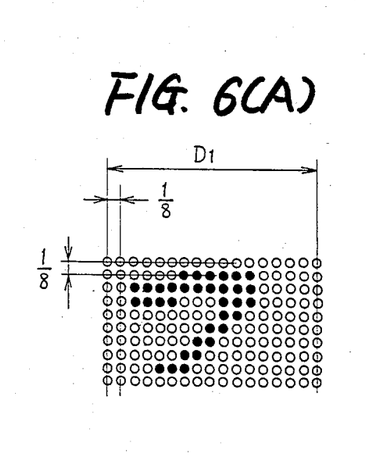
FIG. 6(A) is an illustration indicating a facsimile mode of dot-matrix printing in which dots are produced at a pitch in metric unit.

An example of a part of an image reproduced by the heat generating elements M in the facsimile mode is illustrated in FIG. 6(A), in which D1 represents the spacing (2 mm) of the elements M (whose number n is suitably selected so as to cover a desired portion of the width of the paper 3). Each heat generating element M is controlled (activated or held deactivated) at 16 positions at the ⅛ mm pitch during its movement of 2 mm. Thus, the printing along one line is effected by the elements M. Then, the paper 3 is fed by a distance of 1/7.7 mm. By repeating these printing and feeding operations, images such as characters or graphic representations are printed with black dots which are produced by the energized and heated element M. These actually produced black dots are indicated by black circles in FIG. 6(A). White circles in the figure represent printing positions at which the element M is not energized, and no black dot is produced.

Figure 6B:
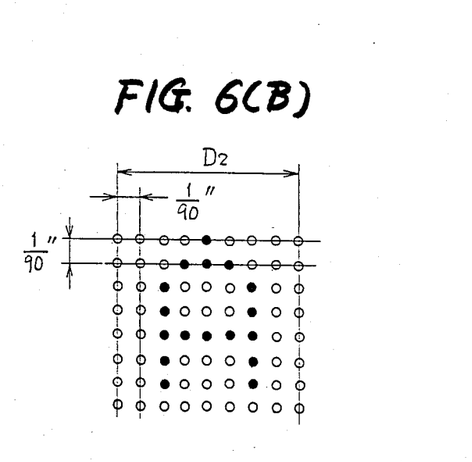
FIG. 6(B) is an illustration indicating a printer mode of dot-matrix printing in which dots are produced at a pitch in inch unit.

If the printer mode is selected on the mode selector switch 75, the CPU 100 goes to step S220 in which is executed a "printer mode" routine to effect printing with the shuttle head assembly 5 being moved at the specified pitch in the inch unit, and with the paper 3 being fed at the specified pitch in the inch unit. Namely, upon reception of the second printing information through the connector 72 and the PIO 108, the DC motor 27 of the head-driving device 7 is started to move the shuttle head assembly 5. During this movement of the head assembly 5, the heat generating elements I of the second printing head are selectively activated at a time interval specified by the timing pulses Ti generated by the photoelectric sensor 35. More specifically, each of the heat generating elements I equally spaced apart by the distance of D2 (8/90 inch) is controlled at eight positions corresponding to the eight timing pulses Ti which are produced by the photoelectric sensor 35 at the time interval of 1/90 inch. As as result, dots are selectively produced along a line on the paper 3 in its width direction, according to the second printing information received at the PIO 108. Then, the stepping motor 41 of the paper feeding device 9 is operated by one step in the counterclockwise direction during the return movement of the shuttle head assembly 5. Consequently, the paper 3 is fed by a distance of 1/90 inch. With the above operation repeated, images represented by the second printing information received from an external computer or other output device are reproduced with a matrix of dots as indicated in FIG. 6(B). In this case, the dot matrix consists of dots which are arranged at the printing pitch of 1/90 inch in the width direction of the paper 3, and at the feeding pitch of 1/90 inch in the length direction. The illustrations in FIGS. 6(A) and 6(B) are magnified about 20 times as large as the actual dimensions.

The illustrated facsimile-printer combination apparatus is normally placed in the facsimile mode in which the printing by the shuttle head assembly 5 and the paper feeding are effected at the specified pitches (⅛ mm and 1/7.7 mm) in the metric unit (in millimeter according to the metric system or the International System of Units). When the printer mode is selected on the mode selector switch 75, the second row I of heat generating elements of the second printing head is rendered operative to effect printing at the specified inch-unit pitch (1/90 inch), and the paper feeding stepping motor 41 is operated in the counterclockwise direction to feed the paper 3 at the specified inch-unit pitch (1/90 inch). Thus, the instant apparatus can be used selectively as a facimile or a dot-matrix printer. Therefore, the use of the instant facsimile-printer combination requires reduced installation space and equipment cost, simplified inventory control of the recording media and reduced maintenance services, as compared with the use of two separate machines, i.e., a facsimile apparatus and a printing apparatus.

While the present invention has been described in detail in its preferred embodiment, it is to be understood that the invention is by no means confined to the precise details of the disclosure of the illustrated embodiment, but the invention may be embodied with various changes, modifications and improvements which may occur to those skilled in the art, without departing from the spirit and scope of the invention defined in the appended claims. For example, the printing pitches in the facsimile and printer modes may be changed as desired. For instance, the printing pitch in the printer mode may be 1/180 inch, to assure improved printing quality with an increased dot density. Further, the paper feeding device 9 using the two one-way clutches to provide two feeding means for the facimile and printer modes of operation may be replaced by first and second feeding means using two stepping motors whose stepping increments correspond to desired feeding pitches used in the facimile and printer modes.

What is claimed is:

1. A facsimile-printer combination of a dot-matrix type, comprising:

first printing means operable in a fascimile mode according to first printing information, for selectively producing first dots on a recording medium, at a first printing pitch in metric unit in a direction of width of said recording medium;

first feeding means operable in association with said first printing means, for feeding said recording medium at a first feeding pitch in the metric unit in a direction of length of said recording medium;

second printing means operable in a printer mode according to second printing information, for selectively producing second dots on said recording medium, at a second printing pitch in inch unit in said direction of width;

second feeding means operable in association with said second printing means, for feeding said recording medium at a second feeding pitch in the inch unit in said direction of length;

input means for receiving said first printing information and said second printing information from output means; and selector means, connected to said input means, said first printing and feeding means, and said second printing and feeding means, for rendering operable said first printing means and said first feeding means when said first printing information is received by said input means, and rendering operable said second printing means and said second feeding means when said second printing information is received by said input means.

2. A fascimile-printer combination according to claim 1, wherein said first feeding means comprises a feed roll rotatably supported for feeding said recording medium, an electrically-operated feed motor operable in opposite directions, and a first rotary transmission linkage for imparting a motion of said feed motor in one of said opposite directions to said feed roll, said first rotary transmission linkage including a first one-way clutch which inhibits transmission of a motion of said feed motor in the other direction to said feed roll, and wherein said second feeding means comprises a second rotary transmission linkage for imparting the motion of said feed motor to said feed roll, said second rotary transmission linkage having a speed reduction ratio different from that of said first rotary transmission linkage, and including a second one-way clutch which inhibits transmission of the motion of said feed motor in said one direction to said feed roll, whereby said feed roll and said feed motor are commonly used by said first feeding means and said second feeding means.

3. A fascimile-printer combination according to claim 1, wherein said first printing means comprises:

a first printing head which has a plurality of printing elements for producing said first dots, and which is movable in said direction of width of the recording medium;

a first head-driving device for moving said first printing head in said direction of width of the recording medium;

a first pulse generator for generating a timing pulse each time said first printing head is moved a predetermined distance, said first printing head being responsive to said timing pulse to selectively activate said plurality of printing elements according to said first printing information, and wherein said second printing means comprises a second printing head, a second head-driving device and a second pulse generator, which are similar to said first printing head, said first-head driving device and said first pulse generator, respectively.

4. A fascimile-printer combination according to claim 3, wherein said first and second head-driving devices are constituted by a single head-driving device which is commonly used by said first and second printing heads, and wherein said first pulse generator generates the timing pulse to indicate said first printing pitch in the metric unit, while said second pulse generator generates the timing pulse to indicate said second printing pitch in the inch unit.

5. A fascimile-printer combination according to claim 1, wherein said first printing means comprises:

a first printing head of a reciprocating shuttle type reciprocable in said direction of width of the recording medium, said first printing head having a plurality of first printing elements which are spaced apart in said direction of width from each other by a predetermined spacing in the metric unit;

a head-driving device for reciprocating said first printing head in said direction of width of the recording medium by a predetermined reciprocating distance larger than said predetermined spacing of said first printing elements, said head-driving device including an electrically-operated head-drive motor, and a cam mechanism for converting a rotary motion of said head-drive motor into linear reciprocating motions of said first printing head; and a first pulse generator including a first rotary disk which is rotated by said head-driver motor and which has a plurality of first slits equally spaced apart from each other in a circumferential direction of said first rotary disk, said first pulse generator further including a first photoelectric sensor disposed so as to detect said first slits during rotation of said first rotary disk, and wherein said second printing means comprises:

a second printing head of a reciprocating shuttle type reciprocable in said direction of width of the recording medium, said first printing head having a plurality of second printing elements which are spaced apart in said direction of width from each other by a predetermined spacing in the inch unit, said second printing head being fixed to said first printing head and reciprocable with said first printing head by said head-driving device; and a second pulse generator including a second rotary disk which is rotated by said head-drive motor and which has a plurality of second slits equally spaced apart from each other in a circumferential direction of said second rotary disk, an angular spacing of said second slits being different from that of said first slits formed in said first rotary disk, said first pulse generator further including a second photoelectric sensor disposed so as to detect said second slits during rotation of said second rotary disk.

6. A facsimile-printer combination according to claim 1, wherein said input means comprises a serial input port which receives said first printing information in a serial form, and a prallel input port which receives said second printing information in a parallel form.

* * * * *